No. 713,840. Patented Nov. 18, 1902.
W. H. BIRCHMORE.
METHOD OF PRESERVING LIQUIDS.
(Application filed Dec. 6, 1901.)
(No Model.)
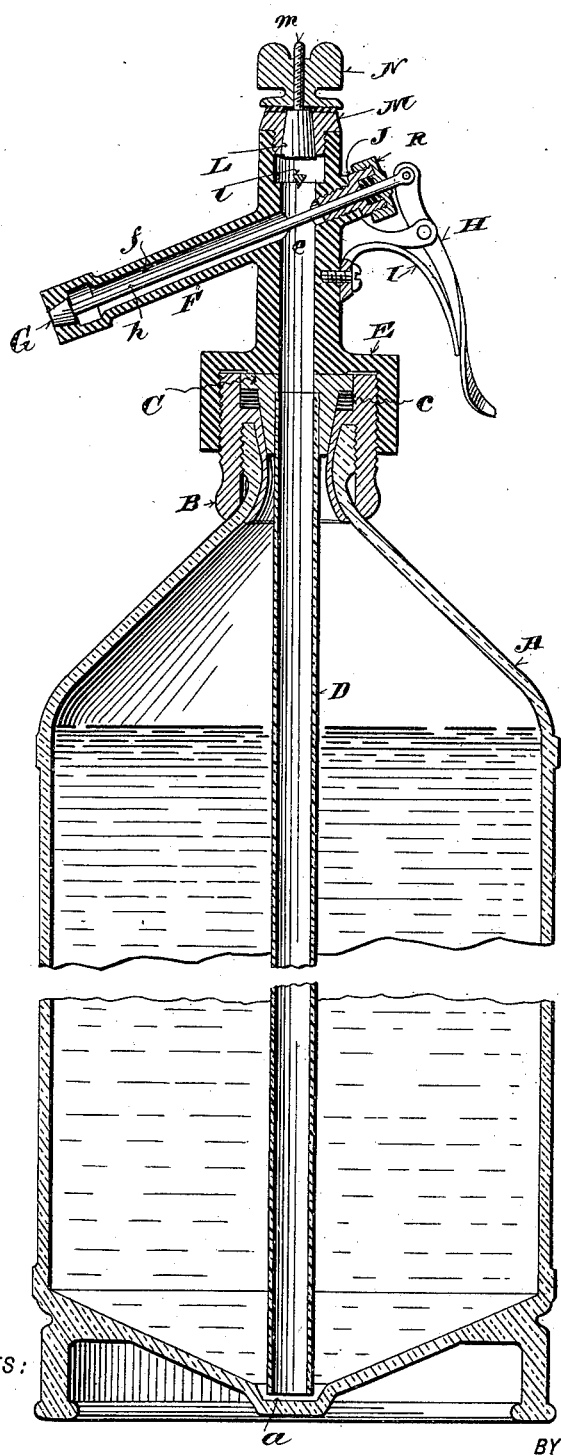

UNITED STATES PATENT OFFICE.

WOODBRIDGE H. BIRCHMORE, OF BROOKLYN, NEW YORK, ASSIGNOR OF ONE-HALF TO CLARKSON A. COLLINS, OF NEW YORK, N. Y.

METHOD OF PRESERVING LIQUIDS.

SPECIFICATION forming part of Letters Patent No. 713,840, dated November 18, 1902.

Application filed December 6, 1901. Serial No. 84,863. (No specimens.)

*To all whom it may concern:*

Be it known that I, WOODBRIDGE H. BIRCHMORE, a subject of the King of Great Britain, residing in the borough of Brooklyn, city of New York, and State of New York, have invented certain new and useful Improvements in Methods of Preserving and Distributing Liquids, of which the following is a specification.

While my invention may be applied generally to any liquid which it is desired to preserve from the action of destructive bacilli, it is more especially intended to be applied to the preservation of milk, the importance of accomplishing which is well understood.

Heretofore it has been proposed to preserve milk by filling an ordinary siphon-bottle therewith, forcing in a sterile gas under pressure sufficient for the expulsion of the milk, and then subjecting the bottle to a pasteurizing temperature. This process has, however, in practice proven worse than useless for several reasons. Thus the spout of the ordinary siphon-bottle, especially after milk has passed through it, forms a veritable trap for filth from the atmosphere, in which disease germs readily propagate and unavoidably enter the milk as often as it is drawn from the siphon. Again, the milk enters the siphon in the presence of an unsterile atmosphere from which any disease germs present can be readily absorbed, and the sterilization of such a body of liquid by the application of a temperature less than 212° Fahrenheit, as is required in pasteurizing, is an extremely difficult matter. In order to obviate these defects and provide for the perfect preservation of milk, I provide, in the first place, an air-tight containing and distributing vessel, more particularly hereinafter described, which has an outlet-valve located at the point of discharge, so that no vacant space is left within the vessel in which filth and disease germs can collect or the residue of successive discharges from the vessel can remain. This vessel is filled with water, preferably previously sterilized, and the vessel, with its contents, is then raised to a positive sterilizing temperature of not less than 212° Fahrenheit. A sterile gas—such as nitrogen, sterilized air, or other sterile gas which will not act deleteriously upon or be readily absorbed by the milk or other liquid to be preserved—is then forced into the vessel under sufficient pressure—say one and one-eighth atmospheres—to force out the water, thus leaving the vessel filled with a sterile atmosphere.

The milk is pasteurized by the application of heat in any usual or convenient manner before being placed in the distributing vessel. It is then forced from the vessel or tank in which it is pasteurized directly into the distributing vessel without contact with the atmosphere and under sufficient pressure to overcome the gas-pressure within the vessel until the vessel is filled with milk, except a small space above the milk, which is occupied by the gas under pressure, whereby the milk is forced out when required for use.

The invention will be best understood by reference to the accompanying drawing, which shows in section a distributing vessel or bottle adapted for use in connection with my process.

Referring to the drawing, A indicates the body of the bottle, which may be made at the bottom with a pit or sink *a* to facilitate the complete expulsion of the liquid therefrom. A soft-metal collar B is swaged or otherwise suitably secured to the neck of the bottle. Within the collar B is a perforated plug C, which carries the glass tube D, extending to the bottom of the bottle. Between the collar B and plug C is a packing *c*, of parchmentized paper or other suitable material. To the collar B is secured the soft-metal top E, through which runs a vertical passage *e*, forming a continuation of the tube D. With the passage *e* is connected the downwardly-inclined discharge-tube F. The opening *f* of the discharge-tube F is closed by the valve G, the outer face of which is flush with the outer end of the tube.

The valve G is arranged to be opened inwardly in any usual or suitable manner, as by the pivoted handle H and stem *h*, and to be held positively closed, as by the spring I.

While the bottle may be filled through the discharge-tube F, I prefer for this purpose to provide the passage *e* at its upper end with a valve L, which is closed upward by pressure from within the bottle, and when such pressure is removed, or by pressure from without, drops or is forced down upon the rests *l*. The valve L is seated in a plug M and is provided with a stem *m*, upon which is screwed a cap N to hold the valve positively in place and securely cover the orifice when the bottle is filled with milk.

In practicing my process the bottle A is first filled or nearly filled with water, which may have been previously sterilized, and is then, with its contents, raised to a positive sterilizing temperature of 212° Fahrenheit or over. A suitable sterile gas, such as nitrogen or sterilized air, is then admitted under pressure through the valve-opening L, and the valve G being opened the water is forced out, leaving the bottle filled with a sterile atmosphere. Pasteurized milk is then forced into the bottle directly from the pasteurizing tank or vessel without contact with the atmosphere through the valve-opening L until the bottle A is filled to the desired point. The milk is forced in under pressure against the pressure of the gas, which is retained in the bottle above the milk, as shown in the drawing, and serves to force out the milk as required for use when the valve G is opened. When the bottle has been filled to the required point and the pressure from without is removed, the valve L will be closed by the pressure within the bottle. It is further secured from accidental opening and from any possible entrance of contaminating material by screwing down the cap N upon the threaded stem *m*. The bottle is then ready for use and may be set away to cool.

While it would be possible without departing from the nature of my invention to simply fill the bottle with sterilized water or steam and omit the succeeding step of heating the bottle and its contents or to fill it with unsterilized water and then heat to 212° Fahrenheit, the essence of my invention in this respect being the sterilization or removal from the bottle of the unsterile atmosphere therein, to the end of leaving the interior of the bottle free from living disease germs, before the introduction of the milk therein, still I prefer, as described and as a further precaution, to first fill the bottle with sterilized water and then subject it and its water contents to a positive sterilizing temperature of not less than 212° Fahrenheit.

It will be evident to those skilled in the art that by the use of my process in connection with the distributing vessel milk or other food liquid once properly sterilized can be preserved indefinitely without the propagation of disease germs therein and can be given to the consumer in a perfectly wholesome condition. The advantage of this for supplying hospitals and for the use of invalids generally will be well understood.

I do not claim herein the vessel illustrated and described in connection with my process, but have made the same the subject of a separate application for Letters Patent, filed March 4, 1902, Serial No. 96,658.

What I claim as new, and desire to secure by Letters Patent, is—

1. The herein-described process for preserving milk and other liquids affording support for germ propagation which consists in sterilizing the liquid to be preserved, filling a container for such liquid with a sterile atmosphere, and then forcing the sterilized liquid to be preserved into said container against the pressure of said sterile atmosphere.

2. The herein-described process for preserving milk and other liquids affording support for germ propagation which consists in sterilizing the liquid to be preserved, filling a container with a sterile atmosphere by first filling it with a sterile liquid, and then forcing in a sterile gas, and expelling the said liquid and then forcing the sterilized liquid to be preserved into said container against the pressure of said sterile atmosphere.

3. The process for preserving milk and other liquids affording support for germ propagation, which consists in sterilizing the liquid to be preserved, filling a container with a sterile atmosphere by first filling it with a liquid, sterilizing said liquid in said container, forcing into said container a sterile gas, and expelling said liquid, then forcing the sterilized liquid to be preserved into said container against the pressure of said sterile gas.

4. The process for preserving milk and other liquids affording support for germ propagation which consists in sterilizing the liquid to be preserved, filling a container with a sterile atmosphere by first filling it with a liquid, sterilizing said liquid in said container, forcing into said container a sterile gas, and expelling said liquid, then forcing the sterilized liquid to be preserved directly from the sterilizing-receptacle into said container, without contact with the atmosphere, and against the pressure of said sterile gas.

In testimony whereof I have hereunto subscribed my name this 4th day of December, A. D. 1901.

W. H. BIRCHMORE.

Witnesses:
   CLARKSON A. COLLINS,
   JAMES A. LYNCH.